Patented Sept. 15, 1936

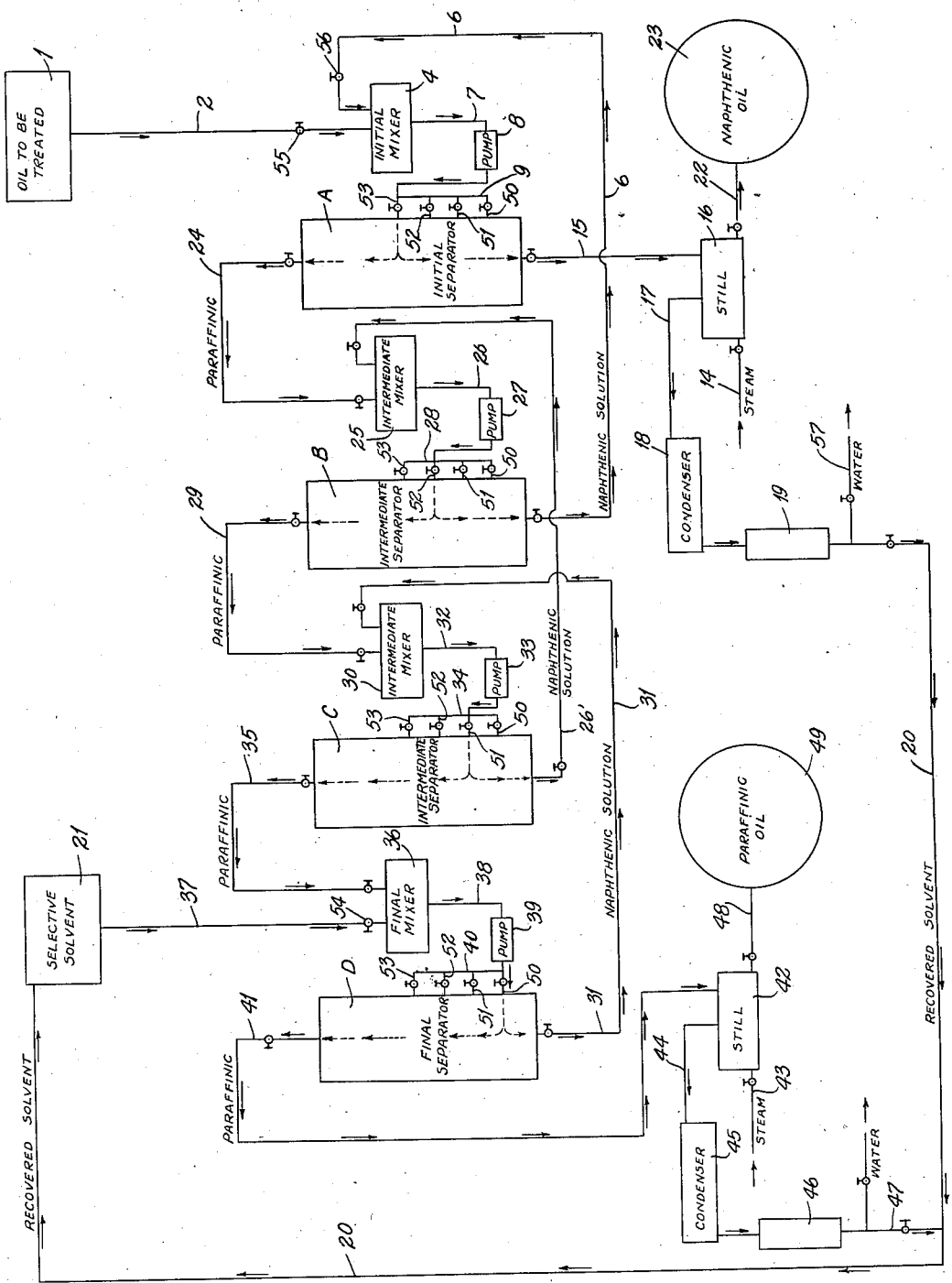

2,054,613

UNITED STATES PATENT OFFICE 2,054,613

APPARATUS FOR MAKING HIGH VISCOSITY INDEX LUBRICATING OILS

Harry T. Bennett, Tulsa, Okla., assignor to Mid-Continent Petroleum Corporation, Tulsa, Okla., a corporation of Delaware Application July 3, 1933, Serial No. 678,848

4 Claims. (Cl. 196—13)

This invention relates to apparatus for making high viscosity index lubricating oils. The invention herein disclosed is more broadly claimed in an application filed by me on March 2, 1931, Serial Number 519,698, which resulted in Patent No. 2,003,233, granted May 28, 1935, and the present application is a continuation in part of said application Serial Number 519,698.

Mineral oils, including petroleum oils, and especially the petroleum lubricating oils, contain different constituents which may be separated from each other by treating the oil with a suitable selective solvent, and thereafter separating the selected fraction from the other fraction of the oil.

Numerous advantages may be obtained by the use of such solvents to improve the quality of the oil. The paraffinic wax may be removed to improve the pour point of the oil, or the naphthenic portion may be separated from the more valuable paraffinic portion to produce a high viscosity index lubricating oil which is highly resistant to sludging and has a low carbon content.

One of the objects of this invention is to provide an efficient apparatus whereby the oil may be continuously treated with a solvent.

Another object is to provide a system wherein the oil is effectively subjected to repeated extraction operations to successively remove undesirable constituents from the oil.

Another object is to provide a relatively quick separation of an oil into the different fractions.

A still further object is to provide an apparatus wherein a continuous flow of the oil and solvent can be accurately controlled at different stages of the process, so as to provide the desired delivery and separation at each stage.

With the foregoing and other objects in view, the invention comprises the novel construction, combination and arrangements of parts hereinafter more specifically described and shown in the accompanying drawing, which illustrates one form of the invention. However, it is to be understood that the invention comprehends changes, variations and modifications which come within the scope of the claims hereunto appended.

In the preferred form of the invention, BB' dichlorethyl ether is employed as the selective solvent, but other halogenated ethers may be used, and some of the advantages of the present invention can be obtained in using various other solvents including nitrobenzene, phenol, aniline, cresol, furfurol, dichlorethylene, trichlorethylene, crotonic aldehdye, etc.

To aid in describing one form of the invention, I will refer to the accompanying drawing, which is a diagrammatical view of an apparatus adapted for use in carrying out the invention.

This apparatus includes a series of settling chambers A, B, C and D, and mixing chambers associated therewith in a manner hereafter described. Briefly stated, the oil to be treated enters an initial mixing chamber at one end of the system, while the fresh solvent enters a final mixing chamber at the opposite end. The oil is subjected to successive mixing and settling operations as it passes from the initial mixing chamber to the final separating chamber, and the solvent is used repeatedly in these operations. The fresh solvent is used in the final separating operation, where it unites with naphthenic portions of the oil to form a naphthenic solution, and this solution is employed in the intermediate and initial separating operations.

During each mixing operation, the selective solvent unites with naphthenic portions of the oil, and during each separating operation the naphthenic solution drops to the bottom of the separating chamber, while paraffinic constituents of the oil rise to the top of said chamber.

The oil to be treated passes from a container 1 through a pipe 2 to an initial mixing chamber 4 where it may be agitated with a solvent-oil solution from an intermediate separating chamber B. This solvent-oil solution may be transmitted from the separator B through pipe 6 to the initial mixer 4.

From the mixer 4 the solvent and oil is transferred through a pipe 7, pump 8 and manifold pipe 9 to an initial separating chamber A where the dissolved naphthenic constituents of the oil fall to the bottom and are withdrawn through pipe 15 to a still 16.

In the still 16 the solvent may be distilled from the oil, and during this operation, steam may be introduced into the still through pipe 14. The steam and solvent vapors pass through vapor line 17 to a condenser 18, where they are condensed and discharged to a water separator 19. The recovered solvent is eventually conducted through a pipe 20 to the solvent supply tank 21.

The naphthenic oil may be withdrawn from the still 16 through a pipe 22 leading to a tank 23.

In the separator A the relatively paraffinic oil rises to the top, and is then transmitted through a pipe 24 to a mixer 25 where it is mixed with a naphthenic solution entering through a pipe 26' from separator C.

The oil-solvent mixture in the mixer 25 may be transmitted through a pipe 26, pump 27 and manifold pipe 28 to the separator B. As has been stated the naphthenic solution in separator B is transferred through pipe 6 to mixer 4.

The paraffinic portion of the oil in separator B is transmitted through pipe 29 to a mixer 30 where it is treated with a naphthenic solution entering through pipe 31 from the separator D.

The oil and solvent mixture in the mixer 30 may be transmitted through a pipe 32, pump 33 and manifold pipe 34 to the separator C, where the relatively paraffinic oil is discharged through a pipe 35 to the final mixer 36. The naphthenic solution in separator C is transmitted through pipe 26' to the mixer 25.

In the final mixer 36 the oil is treated with fresh solvent entering through pipe 37 from the solvent tank 21.

The resultant mixture is transferred through pipe 38, pump 39 and manifold pipe 40 to the final separator D, where the naphthenic solution settles to the bottom and is discharged through the pipe 31 to the mixer 30.

The paraffinic oil rises to the top of the final separator D and is transferred through pipe 41 to a still 42, where it is subjected to a distilling operation and preferably treated with live steam, which may enter through pipe 43 to aid in removing the solvent. The steam and solvent vapors pass through vapor line 44 to a condenser 45 where they are condensed and then discharged to a water separator 46. The solvent is eventually discharged through a pipe 47 to the return line 20 leading to the solvent tank 21.

The paraffinic oil in the still 42 may be transferred through pipe 48 to the paraffinic oil tank 49.

The oil entering the system through pipe 2 is thus subjected to successive mixing and settling operations wherein the solvent discharged from the tank 21 is repeatedly employed to remove the naphthenic constituents of the oil.

The solvent removes a residual portion of naphthenic constituents during the final treatment in mixer 36 and separator D, and removes other portions of naphthenic constituents after each mixing and settling operation, until the solvent containing a relatively large quantity of dissolved naphthenic constituents is finally separated, in still 16, from the naphthenic oil and returned to the solvent tank 21.

It will be noted that the solvent flows in a continuous endless course wherein it is repeatedly recovered from the paraffinic and naphthenic oil fractions, and reused for the succeeding treatments of oil which is continuously supplied to the system.

Each of the separating chambers A, B, C and D is provided with inlets 50, 51, 52 and 53 located at different elevations, so that the mixture to be settled may enter at different horizontal planes. These inlets are connected to the adjacent manifold pipe 9, 28, 34 or 40, and each inlet is provided with a valve, as shown in the drawing, so the mixture flowing into each separator may be introduced at the desired elevation, more or less remote from the bottom.

The desired paraffinic constituents, withdrawn from the top of the final separator D, do not return to this separating system, and a substantial advantage is gained by making a sharp separation of these desired constituents from the naphthenic solution in said final separator. In other words, an object is to obtain a paraffinic product relatively free of any naphthenic solution that should be discharged from the bottom of the final separator D.

Therefore, I prefer to introduce the incoming solvent-oil mixture near the bottom of the final separator through the inlet pipe 50, so as to provide a relatively short course for the naphthenic solution passing to the outlet pipe 31, and a relatively long course for the paraffinic constituents passing to the discharge pipe 41. The naphthenic constituents will, therefore, be readily discharged from the final separator D, and the paraffinic constituents will be more slowly discharged, so as to provide a relatively long period of time for the settling of any suspended dissolved naphthenic constituents in the paraffinic portion of the oil rising to the top of said final separator.

The oil-solvent mixture entering separator C may enter at a slightly higher elevation, such as through inlet pipe 51. The oil-solvent mixtures entering separators B and A may enter at still higher elevations, such as through inlet pipe 52 into separator B and through inlet pipe 53 into the initial separator A.

This initial separator receives the fresh lubricating oil stock mixed with a large quantity of previously used naphthenic solution, the latter being eventually discharged at the bottom of said initial separator A, and I desire to prevent any of the fresh paraffinic oil from escaping into the outgoing stream of naphthenic solution.

By selecting the relatively high inlet 53 at the initial separator A, I provide a relatively short course for the paraffinic oil which readily passes to the discharge pipe 24, while the naphthenic solution moves downwardly in a longer course which provides a relatively long period of time for the release of paraffinic constituents that may be carried in the outgoing naphthenic solution.

The system of inlets at different elevations will, therefore, aid very materially in obtaining a sharp separation of naphthenic constituents from the paraffinic portions of the oil.

Another important advantage, which appears in each of these separating chambers, is due to manner in which the paraffinic and naphthenic portions are quickly removed when they are either light enough to rise to the top, or heavy enough to drop to the bottom. The settling begins when the mixed stream enters one of the vertical separators, but it is a gradual operation. Some of the paraffinic and naphthenic portions may start in the wrong direction, but if the admission of the mixture is carefully regulated, only the heaviest portions will drop entirely to the bottom, and only the lightest portions will reach the top.

Theoretically, the gravity of the liquid in the vertical column varies in accordance with the distance from the bottom of the column, the heaviest liquid being at the bottom and the lightest at the top. Of course, this theoretical condition is modified by the gradual settling which begins at the inlet of the column and continues through the intermediate zones above and below said inlet.

When any paraffinic portion is freed to such an extent that it is light enough to be removed, it will immediately rise to the top, and quickly pass out of the separator, while the less paraffinic compounds will rise more slowly, and undergo a more prolonged settling operation, whereby naphthenic portions are released and dropped before the paraffinic portions reach the outlet at the top.

A similar action occurs in the lower portion of the separating column, where free portions of the dissolved naphthenic constituents readily drop to the bottom and immediately pass out of the column, while less naphthenic portions are subjected to a more prolonged settling operation, whereby paraffinic portions may be released therefrom and permitted to rise, before the heavy naphthenic portion can drop to the bottom.

Briefly stated, there is a gradual settling in each separator, and the constituents of the mixture tend to remain in the separator until they are in condition to rise entirely to the top or drop entirely to the bottom, but just as soon as this condition is obtained, the selected constituent will immediately pass out of the separator.

This action provides a sharp separation of the paraffinic and naphthenic constituents, and it results in a high degree of efficiency while operating at a relatively high speed, as the constituents are promptly removed from the separator when they are in condition to be discharged.

To obtain these results, the rate of flow through the inlets of the separators should be regulated, and if a series of separators are employed, I preferably use a series of pumps to force the mixtures into the separators. This is illustrated by the pumps 8, 27, 33 and 39, each of said pumps being located in the line leading from a mixing chamber to one of the separators. The pumps are regulated to obtain the desired rate of flow, and they serve as means for positively forcing the mixtures into the several separators. Furthermore, the pump pressure forces the constituents through the separators, and also through the discharge pipes leading therefrom.

For example, the pump 33 forces a mixture into the separator C, and the pressure of this pump 33 is utilized to force the separated constituents through the discharge pipes 35 and 26', so as to force the paraffinic portion into the mixer 36, while forcing the naphthenic solution into the mixer 25. The pipes 35 and 26' are provided with valves which are adjusted to regulate the flow of the paraffinic and naphthenic solutions. This valve regulation is important, because the pump pressure is transmitted to the entire contents of said separator C, and since this body of liquid is to be split into paraffinic and naphthenic streams, the valves in the discharge pipes are regulated to obtain and maintain the desired proportion of liquid in each of the streams.

It will be observed that all of the discharge pipes leading from the several separators are provided with regulating valves.

As a specific illustration of one form of my invention, I will hereafter described the treatment of a Mid-Continent lubricating oil which has been subjected to the usual refining methods, such as with acid and clay, and having the following properties:

Gravity 26.4.      Viscosity of 255 at 100° F.
Flash point 405° F.   Viscosity index of 75.

The oil may continually pass from tank 1 through pipe 2 into the system, and the solvent which may be a chlorinated solvent, preferably BB' dichlorethyl ether, may continually pass from tank 21 through the pipe 37 into the mixer 36. The flow of the solvent and oil may be controlled by regulating the valves 54 and 55 so that the quantity of solvent is about 2½ times the quantity of oil.

The temperature of the oil and solvent entering the separating system may be from about 80° to 100° F. Approximately the same temperature may be maintained during the several mixing and settling operations.

After the oil enters the system it is subjected to a mixing operation in the mixer 4 with the naphthenic solution from settler B. The flow of the naphthenic solution may be controlled by regulating the valve 56. The mixture of oil and solvent may be pumped at the desired rate of speed into the separator A through its inlet 53.

The naphthenic solution which is discharged from the separator A may be transmitted to the still 16. The solvent may then be distilled from the oil under a vacuum, and at a temperature of about 280° F. during the first part of the run. It is desirable to thereafter increase this temperature to about 330 while introducing live steam, or an inert gas, through pipe 14 to remove the last portion of the solvent. The solvent may pass from still 16 through vapor line 17, condenser 18 and into the water separator 19, where the water and solvent will separate into layers. The solvent being removed from the separator 19 and returned through pipe 20 to the solvent supply tank 21. The water may thereafter be removed and discharged through pipe 57.

The naphthenic oil remaining in still 16 may be transmitted to the tank 23.

The more paraffinic fraction of the oil in separator A flows to the mixer 25 where it is mixed with the naphthenic solution from separator C and pumped into separator B through the inlet 52.

The more paraffinic oil is transmitted from separator B to mixer 30 where it is mixed with the naphthenic solution from separator D. The resultant mixture of oil and solvent may then be pumped through inlet 51 into separator C from which the more paraffinic oil passes to the final mixer 36 where it is treated with fresh solvent.

The mixture of oil and solvent is pumped from the final mixer 36 through inlet pipe 50 into the final separator D. The paraffinic oil may flow from the final separator D to still 42 where any solvent contained therein may be removed in a manner described in referring to the removal of solvent from the naphthenic oil in still 16. The solvent recovered in still 42 may likewise be returned to the solvent tank 21 for further reuse.

The method herein described removes many of the impurities and coloring material, including asphaltic and tarry matter that may be removed from the oil by treatment with sulphuric acid and clay. However, in actual practice, the lubricating oil stock may be subjected to such acid and clay treatments before it is supplied to the tank 1, and the wax may be removed from said oil either before or after it is subjected to the aforesaid treatments with dichlorethyl ether. If the oil is not previously dewaxed, the wax will pass into the paraffinic fraction, and it can be separated from the lubricating oil in any suitable manner.

After the paraffinic and naphthenic oils are discharged into the tanks 49 and 23, respectively, they are preferably subjected to a light treatment with sulphuric acid, using about ¼ to ½ pound of the acid for each barrel of the oil, and thereafter contacted with a suitable adsorbent, or absorbent, material, such as fuller's earth, or other suitable clay. When treated in this manner, both products are valuable lubricating oils, the greatest value being in the high viscosity index paraffinic oil, having a high resistance to sludging and carbon formation, but the low viscosity index naphthenic oil is quite satisfactory for use in machines that do not require a high viscosity index lubricant.

It is, of course, understood that the system may have more or less mixing and separating chambers and other suitable valves and pumps may be employed to efficiently control the transmission of the fluids from station to station, and that a complete commercial system will include numerous other details not shown in the accompanying drawing. However, this drawing is merely a diagrammatical illustration of one form of the invention, and in view of the foregoing disclosure, such details will be apparent to those skilled in the art. Furthermore, the invention extends to various modifications within the scope of the terms employed in the following claims.

I claim:

1. In an apparatus for making high viscosity index lubricating oils, initial and final mixing chambers, initial and final settling chambers, an oil conductor through which the lubricating stock to be treated is continually delivered to said initial mixing chamber, a solvent container for the continual delivery of selective solvent into said final mixing chamber, each of said settling chambers having an outlet at the top for paraffinic portions of the oil, an outlet at the bottom for the naphthenic solution, and an inlet located between said outlets, means for transmitting the mixture from said initial mixing chamber to the inlet of said initial settling chamber, means for transmitting paraffinic portions of the oil from the top of said initial settling chamber to said final mixing chamber, a conductor through which the mixture of solvent and oil is transmitted from said final mixing chamber to the inlet of said final settling chamber, means for conducting naphthenic solution from the bottom of said final settling chamber to said initial mixing chamber, the inlet of said final settling chamber being relatively close to the bottom thereof, the inlet of said initial settling chamber being substantially farther from the bottom thereof, each of said settling chambers being approximately vertical to form a vertically elongated settling zone and permit immediate discharge of the separated fractions when they rise to the top or drop to the bottom of said settling zone, solvent-recovery apparatus including a still adapted to receive the paraffinic portion discharged from the top of said final settling chamber and a still to receive the naphthenic solution from the bottom of said initial settling chamber, and return conductors through which the distilled solvent is transmitted from said stills to said solvent container.

2. In an apparatus for making high viscosity index lubricating oils, a series of mixers including initial, intermediate and final mixing chambers wherein the oil to be treated is mixed with a traveling selective solvent, a series of separators including initial, intermediate and final separating chambers wherein the mixtures separate into paraffinic and naphthenic fractions, each separating chamber having an inlet for the mixtures, an outlet for the paraffinic fractions and a separate outlet for the naphthenic solution, circulating means whereby the paraffinic portions are transmitted from the initial mixing chamber, through the initial separating chamber, intermediate mixing chamber, intermediate separating chamber, final mixing chamber, and final separating chamber, in the order named, while the naphthenic solution is transmitted from the final separating chamber, through the intermediate mixing and settling chambers and thence through the initial mixing and separating chambers, said circulating means including a series of pumps associated with the series of separators to force the mixtures into said separators, each separator being provided with one of the pumps to permit independent regulation of the flow to the several separators, the pressure of each pump being transmitted through the liquid in one of said separating chambers and thence through the paraffinic and naphthenic streams discharged therefrom, and valves located in the courses of said streams to selectively regulate the discharge of paraffinic and naphthenic fractions.

3. In an apparatus for making high viscosity index lubricating oils, a series of mixers including initial, intermediate and final mixing chambers wherein the oil to be treated is mixed with a traveling selective solvent, a series of separators including initial, intermediate and final separating chambers wherein the mixtures separate into paraffinic and naphthenic fractions, circulating means whereby the paraffinic portions are transmitted from the initial mixing chamber, through the initial separating chamber, intermediate mixing chamber, intermediate separating chamber, final mixing chamber, and final separating chamber, in the order named, while the naphthenic solution is transmitted from the final separating chamber, through the intermediate mixing and settling chambers and thence through the initial mixing and separating chambers, said circulating means including a series of pumps associated with the series of mixers and separators to force the mixtures into said separators, each pump being interposed between one of the mixers and one of the separators, the pressure of each pump being transmitted through the liquid in one of said separating chambers and thence through the paraffinic and naphthenic streams discharged therefrom, and valves located in the courses of said streams to selectively regulate the discharge of paraffinic and naphthenic fractions.

4. In an apparatus for making high viscosity index lubricating oils, initial and final mixing chambers, initial and final settling chambers, an oil conductor through which the lubricating oil stock to be treated is continually delivered to said initial mixing chamber, a solvent container from which a selective solvent is continually delivered to said final mixing chamber, each of said settling chambers being provided with a vertically elongated settling zone having an outlet at the top for immediate discharge of paraffinic portions of the mixture light enough to reach the top, an outlet at the bottom for immediate discharge of the heaviest portions of the naphthenic solution, and an intermediate inlet between said top and bottom outlets, means for transmitting the mixture from said initial mixing chamber to the inlet of said initial settling chamber, means for transmitting paraffinic portions of the oil from the top of the vertically elongated initial settling zone to said final mixing chamber, a conductor through which the mixture of solvent and oil is transmitted from said final mixing chamber to the inlet of the vertically elongated final settling zone, means for conducting naphthenic solution from the bottom of said final settling zone to said initial mixing chamber, distilling apparatus adapted to remove the solvent from the paraffinic and naphthenic products, conductors connecting said distilling apparatus to the top of said vertically elongated final settling zone and also to the bottom of said vertically elongated initial settling zone, and solvent conductors leading from said distilling apparatus to said solvent container, so as to permit transmission of the solvent in an endless course including said mixing and settling chambers.

HARRY T. BENNETT.